United States Patent [19]

Templin et al.

[11] 4,271,663
[45] Jun. 9, 1981

[54] RELEASABLE LOCKING COUPLING PIN FOR CHAIN LINKS

[75] Inventors: Harry W. Templin; Edward O. Enders, both of Indianapolis, Ind.

[73] Assignee: FMC Corporation, San Jose, Calif.

[21] Appl. No.: 51,262

[22] Filed: Jun. 22, 1979

[51] Int. Cl.³ ............................................. F16G 15/00
[52] U.S. Cl. ...................................... 59/84; 474/207; 474/234
[58] Field of Search ............................... 59/84, 78, 90; 74/251 R, 251 C, 251 S, 254, 245 P; 85/DIG. 2; 403/252; 24/213 CS

[56] References Cited

U.S. PATENT DOCUMENTS

| 1,754,209 | 4/1930 | Carr | 24/213 CS |
| 1,760,266 | 5/1930 | Carr | 24/213 CS |
| 2,589,355 | 3/1952 | Faber | 74/254 |
| 4,123,947 | 11/1978 | Smith et al. | 74/245 P |

FOREIGN PATENT DOCUMENTS 792578 4/1958 United Kingdom ................... 74/245 P Primary Examiner—John McQuade
Attorney, Agent, or Firm—Jack W. Edwards; R. B. Megley

[57] ABSTRACT

Adjacent links of a chain are releasably locked together by a pin, which is inserted through the pivot joints of the chain. The pin has spaced apart shoulders which engage the outer surfaces of the outer links at the pivot joints when the pin is fully inserted in the links. The pin has a front end which is compressible to permit passage of the forward locking shoulder through the inner and outer links of the chain.

2 Claims, 7 Drawing Figures

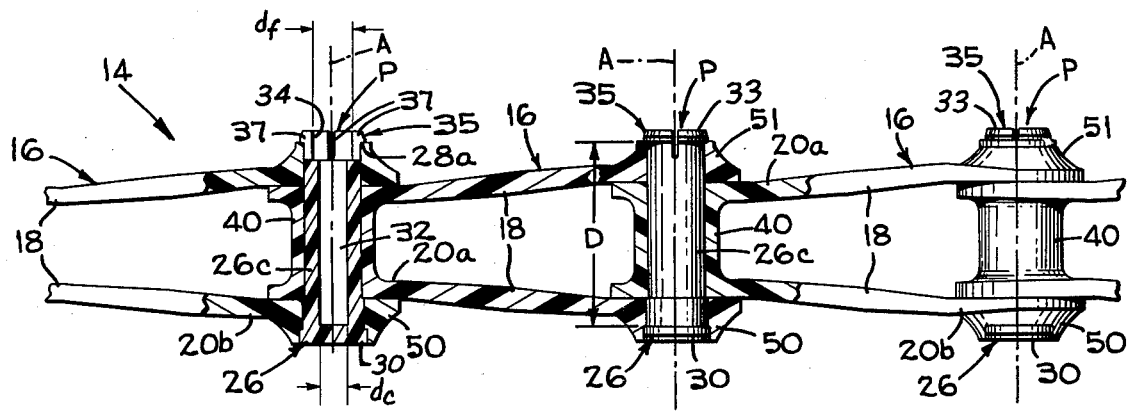
FIG_1
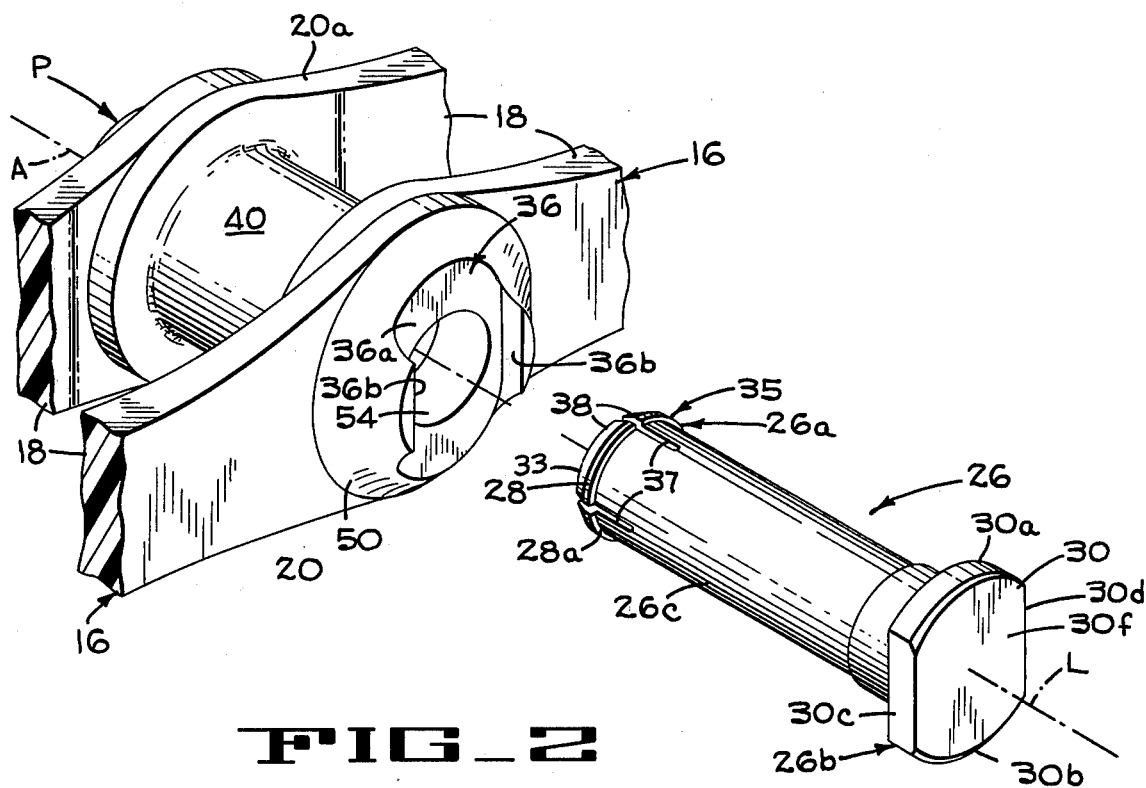
FIG_2

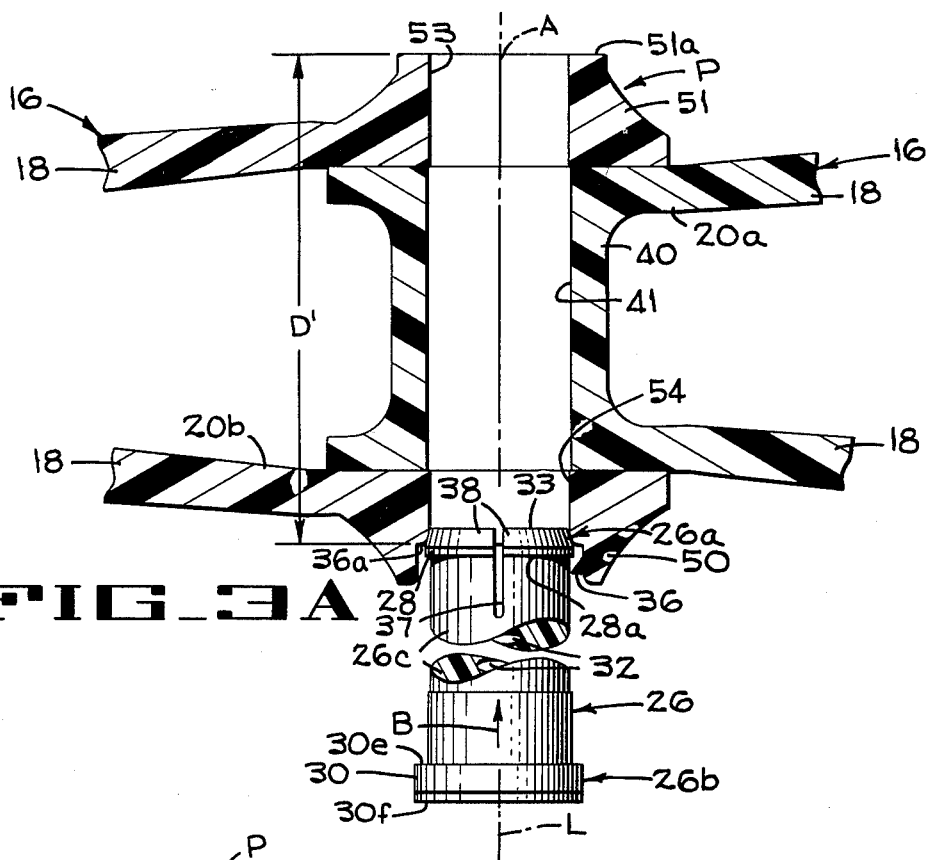
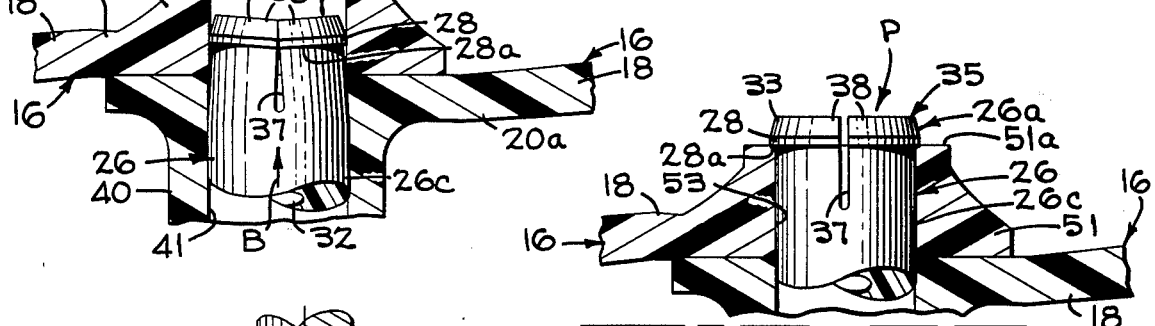
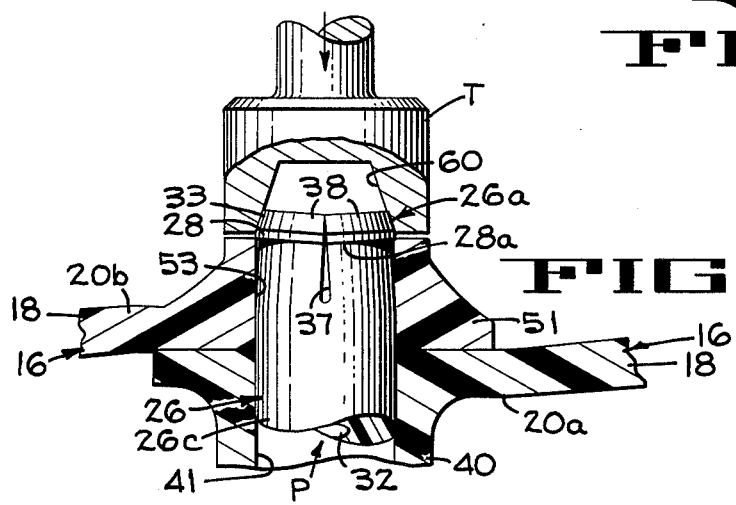

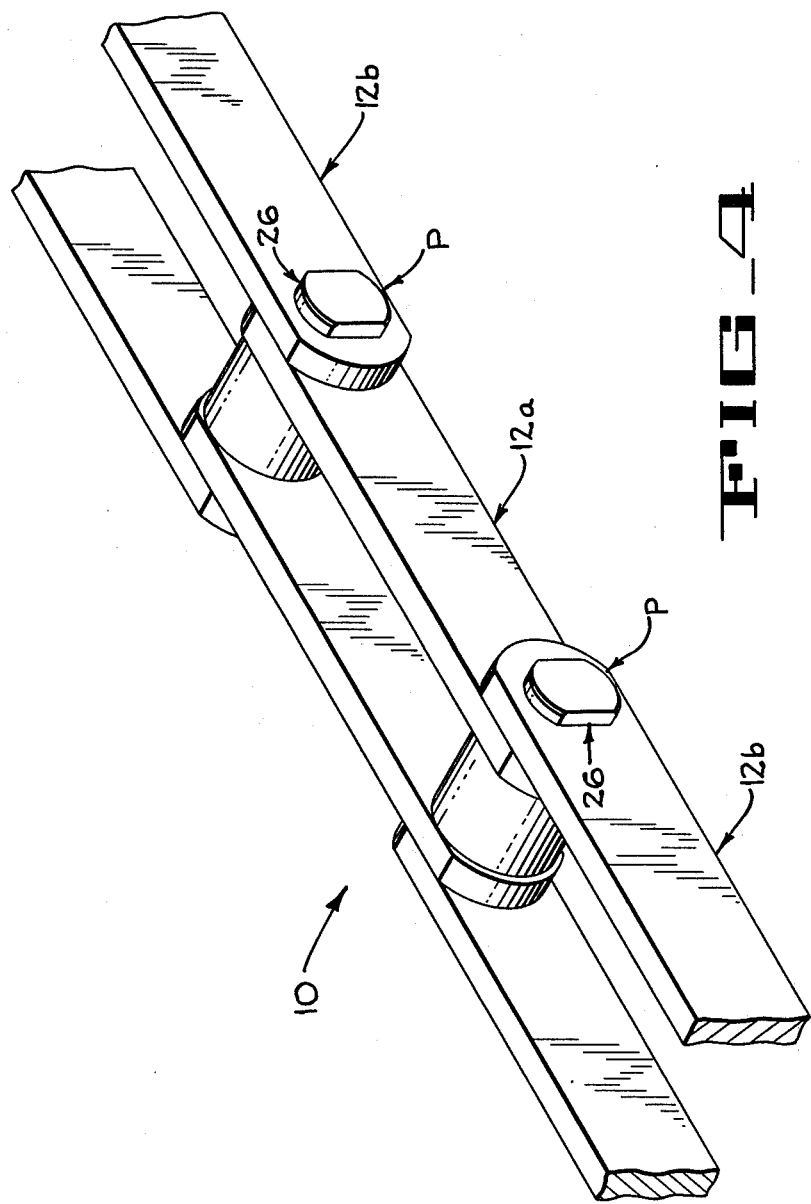

RELEASABLE LOCKING COUPLING PIN FOR CHAIN LINKS

BACKGROUND OF THE INVENTION

1. Field of the Invention

The present invention relates to link chains and, more particularly, to the pins by which adjacent links of a chain are pivotally coupled together.

2. Description of the Prior Art

In the usual chain, each link is pivotally connected at pivot joints in end to end array with adjacent links by means of pins which extend through aligned openings in the links. It is generally necessary to lock the pin into the links to prevent displacement therefrom which would result in a separation of the chain.

One method used heretofore to lock the pins in the links consists of upsetting their ends as shown, for example, in U.S. Pat. No. 3,107,777, which issued to Steorts Oct. 22, 1963. Such a riveted pin, however, cannot be removed without destruction, and separation and reconnection of the chain for repair or replacement of links is difficult and uneconomical.

Another previously used method to secure the pins in the chains consists of inserting cotter pins in transverse bores through the ends of the pins, as shown in U.S. Pat. No. 3,180,165, which issued to Bain on Apr. 27, 1965. Another prior art method of retaining the pins in the chain is by the use of spring clips on the ends of the pins, as shown, for example, in the U.S. Pat. No. 3,353,421 to Ketterle, which issued Nov. 21, 1967. Cotter pins and spring clips can become dislodged during operation of the chain, and constitute small parts which, particularly in field installation or repair of a chain, can become lost or misplaced.

SUMMARY OF THE INVENTION

There is provided in the present invention a pin which can pivotally couple adjacent chain links without being permanently riveted into said links. Moreover, the pin alone, without additional parts, can be securely locked in chain links of any type which are pivotally coupled together to form a chain. The pin can be quickly released from, and/or replaced in, the links without the inconvenience of destroying the pin, or requiring small additional locking parts to retain the pin.

In accordance with the present invention there is provided a pin for insertion through portions of adjacent chain links to couple said chain links together at a pivot joint, said pin having a forward end and a rearward end with respect to the directional sense of axial insertion into said links, said pin having a first shoulder adjacent the forward end and a second shoulder at the rearward end, said shoulders being spaced apart to receive the coupled links therebetween, a tapered nose forward of said first shoulder, and a slot extending rearwardly from the extreme forward end of said pin through said nose and past said first shoulder to permit deflection of said first shoulder for insertion through said links, said pin having an internal cavity near the forward end of the pin and a central cylindrical cavity between the forward internal cavity and the rearward end of the pin, said central cylindrical cavity having a smaller diameter than the forward cavity to strengthen the cylindrical pin portion surrounding the central cavity for transmitting forces between the chain links.

It is therefore one object of the present invention to provide a releasable pin to hold adjacent chain links together.

It is another object of the present invention to provide a releasable pin with a positive locking action to pivotally hold adjacent chain links together.

It is yet another object of the present invention to provide a pin for pivotally holding adjacent chain links together which can be easily inserted into the chain links and easily released from the chain links without destruction, and which can be locked into chain links without additional parts.

BRIEF DESCRIPTION OF THE DRAWINGS

FIG. 1 is a fragmentary plan view of a chain coupled with pins constructed in accordance with the present invention, with some parts in cross-section for clarity.

FIG. 2 is an exploded view, in perspective, of the pin of the present invention, and a portion of the links into which it is to be inserted.

FIG. 3A is a fragmentary plan view, partly in cross-section, of the inside and outside links at a pivot joint, with a pin about to be inserted into the near side of the outer link.

FIG. 3B is a fragmentary plan view, partly in cross-section, of the pin partly inserted partially through the pivot joint and into the far side of the outer link.

FIG. 3C is a fragmentary view of the leading or front end of the pin after the pin is fully inserted in the links at the pivot joint.

FIG. 3D is a fragmentary view of the leading, or front, end of the pin being compressed by a tool for retraction from the chain links.

FIG. 4 shows the pins of the present invention installed in another type of chain.

DESCRIPTION OF THE PREFERRED EMBODIMENT

A typical chain, such as the chain 10 shown in FIG. 4, has a series of links pivotally connected at pivot joints P in end-to-end relation. Every other link is an inner link 12a, and alternate links are outer link 12b. In a chain of this type, both ends of each link 12a constitute inner link portions, and both ends of each link 12b constitute outer link portions. Another type of chain, such as the chain 14 shown in FIG. 1, has only one type of link 16, and these links are pivotally connected at pivot joints P in end-to-end relation. Each link 16 has two spaced apart curved side bars 18 which, at the narrow end, define an inner link portion 20a and, at the wide end, define an outer link portion 20b.

In both the chain 10 and the chain 14, adjacent links are coupled together in overlapping relationship at each pivot joint P on axis A. At each pivot joint P, there is an inner link portion and an outer link portion. It is immaterial in the present invention whether a single link constitutes the inner link portion at two adjacent pivot joints P (as in chain 10), or whether a single link constitutes the inner link portion at one pivot joint P and the outer link portion at an adjacent pivot joint P (as in chain 14). We have, however, illustrated our invention in more detail with respect to the chain 14 of FIG. 1.

As shown best in FIG. 2, the chain link coupling pin 26 of the present invention has a leading or forward end 26a and a rearward, or trailing, end 26b (with reference to the directional sense of insertion into the chain links 16 at the pivot joint P, as indicated by arrow B in FIGS.

3A and 3B). The coupling pin 26 also has a cylindrical shank 26c between the two ends.

The coupling pin 26 has a central longitudinal axis L, and has a rib 28 which defines a first, or forward, shoulder with a flat, rearwardly facing, annular locking surface 28a, normal to the axis L. The juncture of the flat locking surface 28a and the cylindrical shank 26c, defines a sharp corner.

The pin 26, which has a solid base 30 at its extreme rearward end, is hollow forward of the base 30, having a central cylindrical cavity 32, and a forward cylindrical cavity 34 forming an extension of cavity 32 but of larger diameter $d_f$ than diameter $d_c$ of cavity 32. The cavity 34 extends to, and opens on, the extreme front end of pin 26 to define the interior of an annular shell 35 that is located at the front of the pin. This shell extends from the extreme front end of the pin rearwardly beyond the rib 28.

The shell 35 has an outer tapered surface which defines a nose 33, tapering inwardly toward axis L from the rib 28 to the extreme front end of the pin. Four slots 37, ninety degrees apart (and parallel to longitudinal axis L) are cut through the shell to define four flexible tangs 38 which normally assume the position shown in FIGS. 2, 3A and 3C. The tangs, however, can be deflected radially inward to bring the diameter of the rib to substantially the diameter of the shank 26c, as shown in FIG. 3B, for insertion into, or withdrawal from, the chain links. The cylindrical shank portion surrounding the central cylindrical cavity 32, between the tangs and the base 30, has a greater wall thickness than the shell which surrounds the forward cylindrical cavity 34, as shown in FIG. 1. Thus, this shank portion provides the necessary structural support for transmitting forces between the chain links 16.

The base 30 is of truncated circular shape, having a circular top edge 30a and a circular bottom edge 30b (when oriented as viewed in FIG. 2) and straight parallel side edges 30c,30d. Preferably, the shape of base 30 is the same as a cavity 36 in the outer surface of one side of the outer link of the chain, as will be described more fully hereafter. The inner surface of the base (see FIG. 3A) defines a rear shoulder which consists of a flat, rearwardly facing, locking surface 30e normal to axis L. The distance between the forward locking surface 28a of the pin and the rear locking surface of the pin is indicated as D in FIG. 1.

The outer link portion at pivot joint P has a near side (the side first encountered by a pin 26 being inserted) and a far side. These two sides are different, and each will now be described.

The near side of the outer link portion has, at the wide end 20b, a boss 50 with the cavity 36 to receive the base 30 of the pin 26. The cavity 36, which is made by a vertical milling cut through the outer end of the boss 50, has a flat seating surface 36a (normal to axis L) and side walls 36b. The near side of the outer link portion also has a bore 54 of circular cross-section extending through the side bar. The boss, cavity and bore are centered with respect to transverse axis A when the links are positioned for coupling. When a pin 26 is fully inserted through pivot joint P, the locking surface 30e seats on cavity bottom surface 36a and the extreme rearward end 30f of the base 30 of pin 26 is flush with the outer ends of walls 36b.

The far side of the outer link portion has, at the wide end 20b, a boss 51 and a bore 53 through the boss and sidebar on the axis A when the link is positioned for connection at pivot joint P.

The distance D' (FIG. 3A) between the bottom surface 36a of cavity 36 and the outer surface 51a (which is normal to axis A) of boss 50 is slightly less than the distance D between the locking surfaces 28a and 30e of the pin so that the pin 26, when in its locking position (FIG. 1) embraces the outer link portions at the pivot joints P.

The operation of the pin of present invention is illustrated in conjunction with chain 14, which has a plurality of like links 16 coupled together on the pivot axes A passing through pivot joints P. The side bars 18 of the link curve outwardly from a hub 40 at the narrow end 20a of the link to the wide end 20b of the link. At each pivot joint P, the hub 40 (which has a bore 41 at the narrow end of the link) is received in overlapping relation between the ends of the side bars 18 at the wide end of an adjacent link. Thus, the hub and side bars at the narrow end of one link form the inner link portion at each pivot joint P and the spaced side bars at the wide end of an adjacent link form the outer link portion at that pivot joint.

The pin 26 is inserted through pivot joint P on axis A as shown in FIGS. 3A, 3B and 3C, when the bores at the wide end of one link and the bores at the narrow end of an adjacent link are aligned on axis A for coupling. The leading end 26a of the pin is inserted into cavity 36 and bore 54, as shown in FIG. 3A. When pressure is applied in the direction of arrow B, the nose is compressed and the pin is pushed through the near side of the outer link portion, the hub and sidebars of the inner link portion, and the far side of the outer link portion, as shown in FIG. 3B. When the pin is fully inserted, the forward end of the pin snaps out to its normal position (as shown in FIG. 3C) with the shoulder 28a locking the pin in the inserted position. In this locking position, the base 30 of the pin is fully within cavity 36 to prevent rotation of the pin. Since the locking shoulder 28a engages the outer surface 51a of the sidebars, proper locking engagement of the pin can be checked by visible inspection.

For easy removal of the pin, a tool T having a conical cavity 60, is pushed over the nose 33, compressing the tangs 38 thereof to permit the rib 28 to enter and pass through the far sidebars of the outer link portion, the inner link portion, and the near sidebars of the outer portion for separation of the adjacent chain links.

Although the best mode contemplated for carrying out the present invention has been herein shown and described, it will be apparent that modification and variation may be made without departing from what is regarded to be the subject matter of the invention.

What is claimed is:

1. A pin for insertion through portions of adjacent chain links to couple said chain links together at a pivot joint, said pin having a longitudinal axis, said pin also having a leading or forward end and a trailing or rearward end with respect to the directional sense of axial insertion into said links, said pin having a rib defining a first shoulder adjacent the forward end of the pin, said first shoulder constituting a rearwardly facing locking surface, said pin having a tapered nose forward of said rib, said pin having an internal cavity opening on the forward end of the pin and slots extending rearwardly from the extreme forward end of said pin through said nose and beyond said rib to permit radial contraction of the forward end of the pin on insertion through said links, said pin having a base at the rearward end thereof defining a second shoulder, said second shoulder constituting a forwardly facing locking surface, said rearwardly facing locking surface and said forwardly facing locking surface spaced apart a distance to embrace the extreme outside surfaces of the outer link at said pivot joint, said pin having a central cylindrical cavity that is located between the internal cavity at the forward end of the pin and the base, said central cavity having a smaller diameter than the diameter of the forward cavity to strengthen the cylindrical pin portion surrounding the central cavity for transmitting forces between the chain links.

2. A pin for insertion through portions of adjacent chain links to couple said chain links together at a pivot joint, said pin having a longitudinal axis, said pin also having a leading or forward end and a trailing or rearward end with respect to the directional sense of axial insertion into said links, said pin having a cylindrical shank and having a rib defining first shoulder adjacent the forward end of the pin, said first shoulder extending radially outward beyond said shank to define a rearwardly facing locking surface normal to said longitudinal axis, said pin having a tapered nose forward of said rib and terminating at the forward end of the pin, said pin having a cavity opening on the forward end of said pin and having slots extending in a longitudinal direction rearwardly from the extreme forward end of said pin through said nose and rib and into said shank behind said rib to permit radial contraction of the forward end of the pin on insertion of the pin through said links, said pin having a base at the rearward end thereof defining a second shoulder, said second shoulder constituting a forwardly facing locking surface normal to said longitudinal axis, said rearwardly facing locking surface and said forwardly facing locking surface spaced a distance to embrace the extreme outside surfaces of the outer link at said pivot joint, said pin having a central cylindrical cavity that is located between the cavity at the forward end of the pin and the base, said central cavity having a smaller diameter than the diameter of the forward cavity to strengthen the cylindrical shank portion surrounding the central cavity for transmitting forces between the chain links.

* * * * *